United States Patent [19]

Rivard

[11] Patent Number: 4,812,078

[45] Date of Patent: Mar. 14, 1989

[54] MECHANIZED UNIT FOR DIGGING A TRENCH AND LAYING ELONGATE OBJECTS

[75] Inventor: Daniel Rivard, Daumeray, France

[73] Assignee: ETS. Rivard S.A., Daumeray, France

[21] Appl. No.: 63,966

[22] Filed: Jun. 19, 1987

[30] Foreign Application Priority Data

Jun. 26, 1986 [FR] France ................. 86 09277

[51] Int. Cl.⁴ ..................... F16L 1/02; H02G 9/00
[52] U.S. Cl. .......................... 405/179; 405/174
[58] Field of Search ............ 405/174, 176, 177, 179, 405/180

[56] References Cited

U.S. PATENT DOCUMENTS

| | | | |
|---|---|---|---|
| 2,738,745 | 3/1956 | Harpold | 405/179 X |
| 3,203,188 | 8/1965 | Evans | 405/179 |
| 4,208,902 | 6/1977 | Courson et al. | 405/179 X |
| 4,332,511 | 6/1982 | Bradley et al. | 405/179 X |
| 4,539,765 | 9/1985 | Reece | 405/179 X |
| 4,616,957 | 10/1986 | Burrows et al. | 405/179 |

Primary Examiner—David H. Corbin
Attorney, Agent, or Firm—Fisher, Christen & Sabol

[57] ABSTRACT

A mechanized unit is provided for digging a trench in the ground and laying elongate objects in the trench, including a motor driven vehicle, a digging wheel connected to the rear of the vehicle, and a reserve connected to the front of the vehicle and containing said elongate objects, and a guide device for laying said objects in the vicinity of the bottom of the trench, the device being connected to the vehicle, said mechanized unit further including a receptacle connected to the vehicle and containing a fine powdery material and means for feeding said material from the receptacle to the guide device so that, during formation of the trench by the digging wheel, said elongate objects are buried in the fine powdery material deposited in said trench.

12 Claims, 3 Drawing Sheets

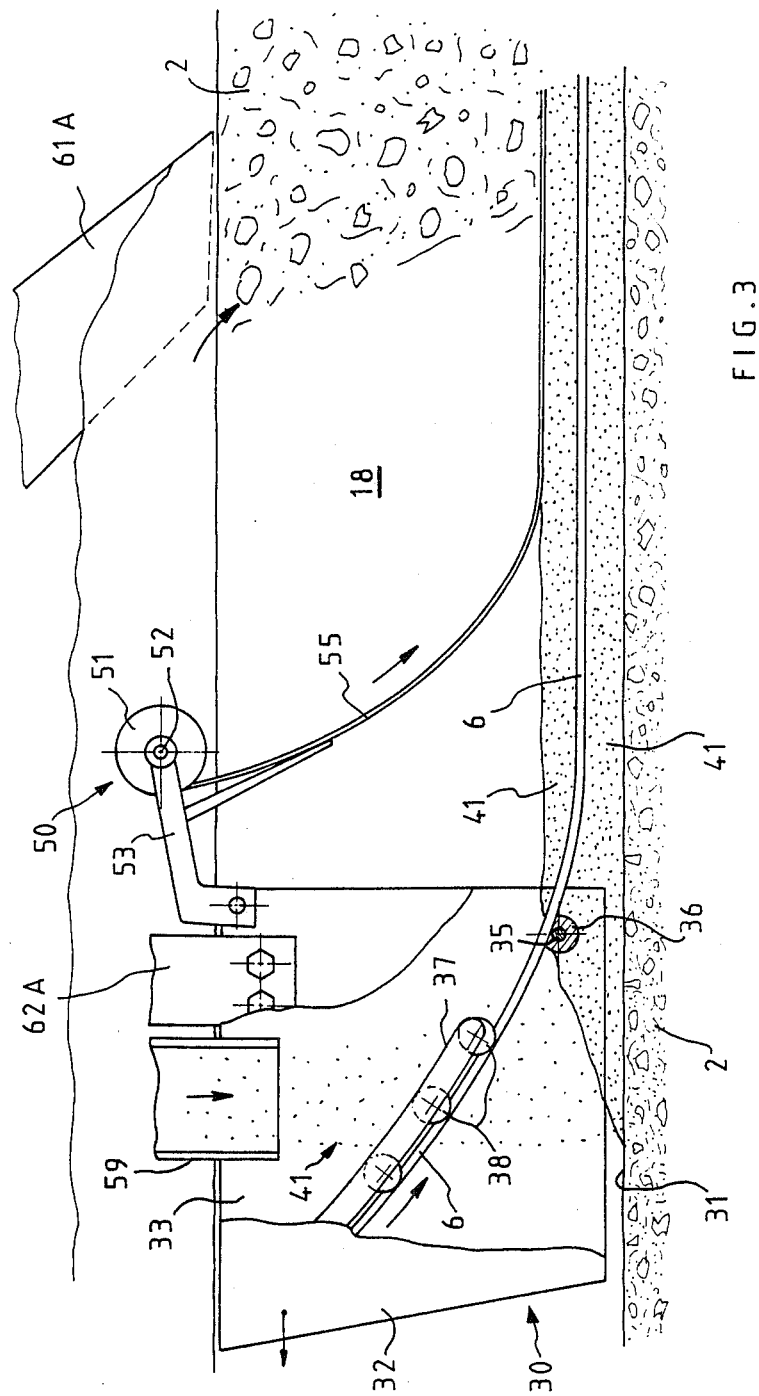

MECHANIZED UNIT FOR DIGGING A TRENCH AND LAYING ELONGATE OBJECTS

BACKGROUND OF THE INVENTION

The present invention relates to a mechanized unit for digging a trench in the ground and laying elongate objects or similar in said trench.

Although not exclusively the mechanized unit of the invention is more particularly intended for laying electric or telephone cables or flexible pipes or ducts in the ground. Mechanized units are already known for carrying out these different operations. Such a mechanized unit includes more particularly a motor driven vehicle, generally a tractor or a public works vehicle, on which are mounted, for example in front of the vehicle, a reserve containing said elongate objects and, at the rear of the vehicle, a digging wheel for digging the trench. In general, a guide device for laying the elongate objects in the bottom of the trench is connected to the vehicle and causes the objects to assume a given curvature so that they are suitably laid in the bottom of the trench.

Thus, during movement of the motor driven vehicle, the digging wheel, driven by a motor, digs a trench while discharging the earth on each side thereof and, simultaneously with its formation said objects pass through the guide device and are laid in the bottom of the trench. This type of mechanized unit has however drawbacks. In fact, the bottom of the trench thus formed is very often formed of an amalgam of earth and rocks which are more or less sharp and cutting. Thus, the objects or similar risk being damaged in contact with the rocks and stones. Beginnings of cracks and slits then appear in the protective coating of said objects and may subsequently cause stripping of said objects or breakage thereof. This risk of damage is all the greater since the amalgam of earth and rocks discharged on each side of the trench during formation thereof is brought back therein. In fact, under the action of the weight of this amalgam, the objects are pressed against the bottom of the trench and so against the sharp edges of the rocks. In addition, sharp rocks, during filling of the trench fall directly on the objects thus causing cuts therein.

Furthermore, another drawback of the presently known mechanized units resides in the fact that the amalgam of earth and rocks removed from the trench is brought back therein either by means of an other vehicle adapted for this type of filling operation or manually, workmen equipped with shovels filling the trenches. Whatever the solution used, it causes an additional cost.

The aim of the present invention is to overcome these drawbacks and relates to a mechanized unit for digging a trench and laying elongate objects in said trench which avoids the risks of damage to said elongate objects and which may also fill the trench thus formed, once said elongate objects have been laid.

SUMMARY OF THE INVENTION

For this, in accordance with the invention, the mechanized unit for digging a trench in the ground and laying elongate objects or similar in said trench or the type including:
a motor driven vehicle;
a digging wheel connected to said vehicle;
a reserve containing said elongate object and connected to said vehicle; and
a guide device for laying said elongate objects close to the bottom of said trench, the guide device being connected to said vehicle, is remarkable in that it further includes:
a receptacle connected to said motor driven vehicle containing a fine powdery material; and
means for feeding said fine powdery material from said receptacle to said guide device so that, during formation of said trench by the digging wheel, said powdery material flows below said elongate objects in the bottom of the trench, then covers said elongate objects, these latter thus being buried in said fine powdery material deposited in said trench.

Thus, by means of the invention, said elongate objects are no longer directly in contact with the earth and rocks but are covered with a fine powdery material which thus provides protection, this covering operation being carried out continuously during digging of the trench and the laying of said elongate objects.

Advantageously, said receptacle is mounted on a trailer hitched to said motor driven vehicle, said trailer being disposed substantially parallel to said digging wheel.

In a preferred embodiment, said receptacle containing said fine powdery material includes a movable bottom for driving and stirring said powdery material for removal thereof to said feed means. Said movable bottom may be formed of at least one conveyor belt driven, for example, by a motor.

According to another characteristic of the invention, said means for feeding the fine powdery material are disposed transversally to said receptacle, during digging of the trench. Said fine powdery material may then be poured from the receptacle into said trench parallel to said trailer. The feed means are, for example, formed by an endless screw rotated by a motor.

According to another characteristic of the invention, said reserve may be formed by a reel, on which said elongate objects are wound, said reel being mounted by means of its shaft in notches formed on arms mounted for pivoting on said motor driven vehicle, and being disposed transversally with respect to said vehicle. In an advantageous embodiment, each arm has at least two notches with thus the possibility of receiving different types of reels. In a particular embodiment, three arms may be mounted in parallel on a support mounted for pivoting on said vehicle. Thus, a first reel may be mounted by means of its shaft in notches formed respectively in the first and second arms and a second reel may be mounted by means of its shaft in the other notch of the second arm and in the corresponding notch of the third arm.

In a preferred embodiment, the guide device for laying said elongate objects may be formed of two plates spaced apart and connected together by spacers, said elongate objects thus passing into the space formed between said plates while being guided by a set of rotary rollers mounted on shafts fixed to said plates, these latter being fixed to a chassis carrying said digging wheel and being intended to be housed in said trench. Said elongate objects thus take on a given curvature so that they are laid substantially tangentially and parallel to the bottom of the trench.

According to another characteristic of the invention, the motor driven vehicle includes signalling means, formed for example by a strip disposable on said fine powdery material surrounding said elongate objects. Said signalling means are carried for example by the guide device. With said strip thus laid, the type of objects buried in the powdery material as well as their positions may be identified.

In accordance with the invention, the mechanized unit advantageously includes, at the rear of the guide device, means for filling said trench so as to bring back into the trench the earth removed by said digging wheel during the formation thereof.

In a preferred embodiment, the filling means are formed by two ploughshares each connected to an arm fixed to the guide device, the two ploughshares being oriented so as to converge towards the median vertical plane of the trench, the point of convergence moving away from said guide device connected to said digging wheel.

DETAILED DESCRIPTION OF THE DRAWINGS

The FIGS. of the accompanying drawings will better show how the invention may be realised. Identical references designate similar elements.

Figure 1:
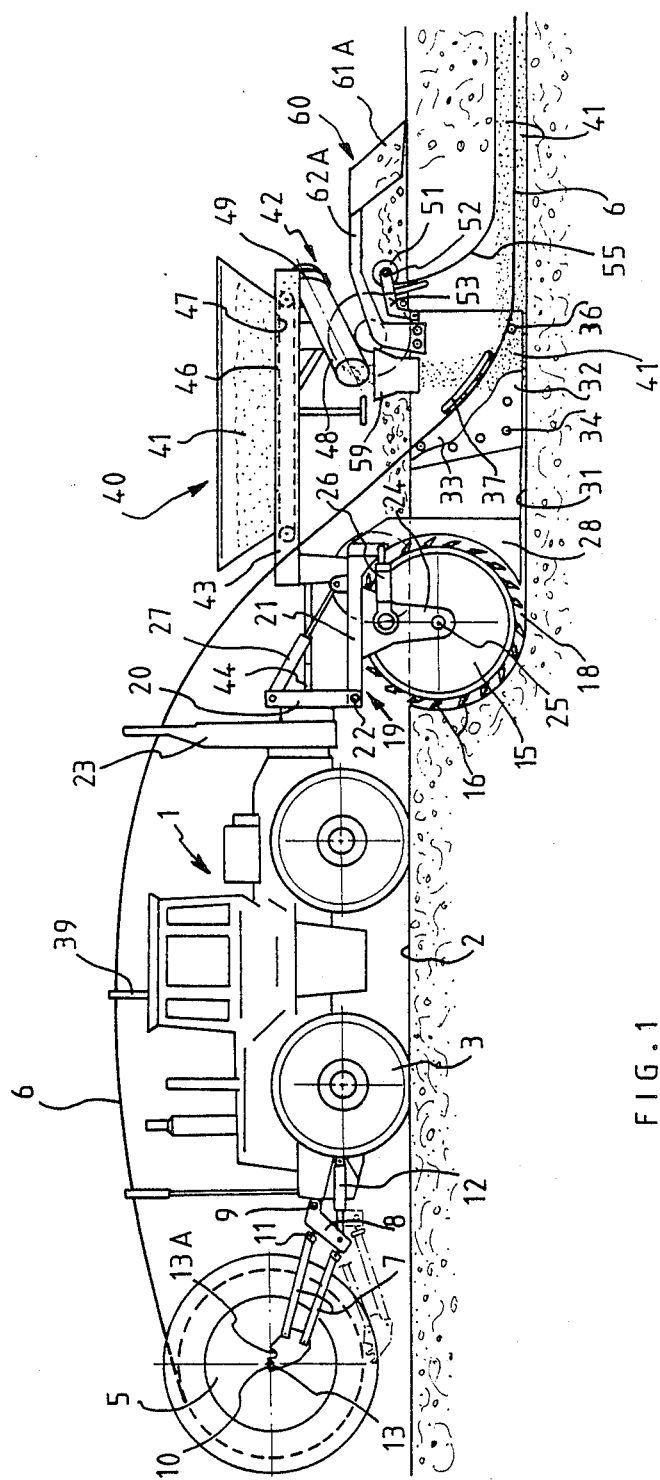
Figure 2:
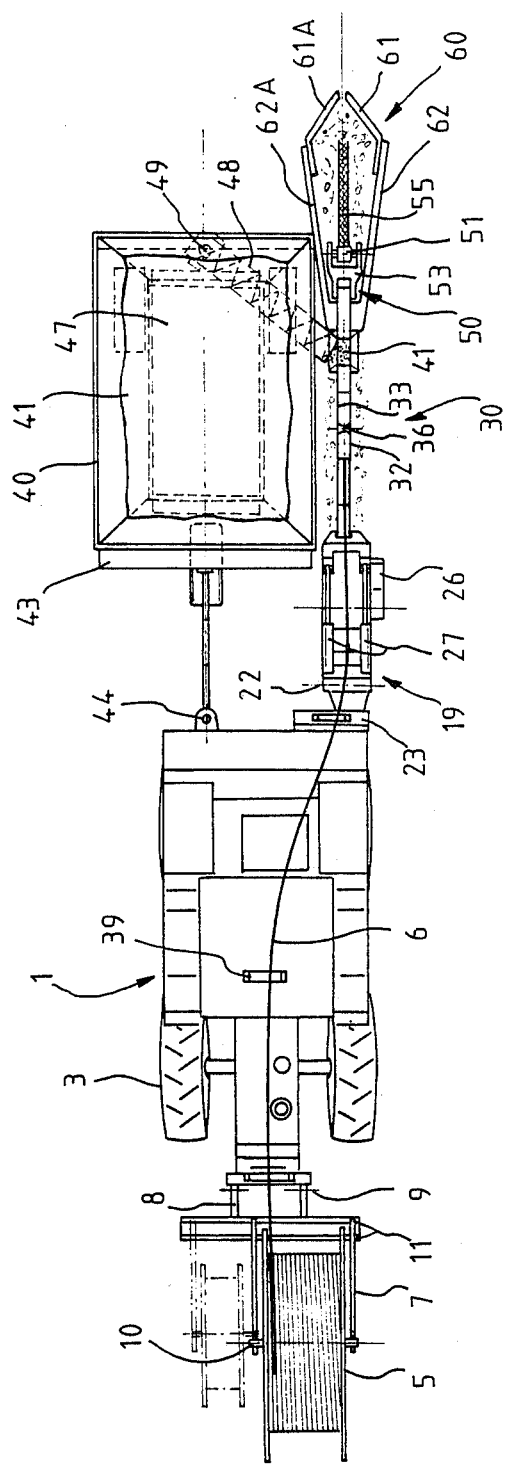

FIG. 1 shows, in elevation, the mechanized unit of the invention during operation, FIG. 2 shows in a top view the mechanized unit of FIG. 1, and FIG. 3 shows an enlarged view illustrating the laying of said elongate objects in said trench.

DESCRIPTION OF THE PREFERRED EMBODIMENTS

The mechanized unit of the invention is intended for digging trenches in the ground and laying elongate objects or similar in the trenches.

The mechanized unit, shown in FIGS. 1 and 2, includes a motor driven vehicle 1 of a public works vehicle type resting on the ground 2 by means of wheels 3, even caterpillar tracks.

A reserve containing said elongate objects, for example a reel 5 on which cables 6 are rolled, is mounted in front of the vehicle on rigid arms 7 connected to a support 8 mounted for pivoting, about a shaft 9, in front of the vehicle. More precisely, two arms 7 disposed on each side of the reel carry the shaft 10 thereof, and are mounted in grooves 11 formed in support 8. Thus, the spacing between the two arms may be adjusted depending on the width of the reel used. In addition, two jacks 12, articulated to the front of the motor driven vehicle 1 and to support 8 permit the reel to be raised and lowered onto the ground by means of arms 7 connected to said support, this latter pivoting about shaft 9.

In another variant of construction, illustrated with dot dash lines in FIG. 2, a third arm identical to the preceding ones may be mounted in grooves 11 in support 8. With this particular arrangement, a first reel may be mounted between the first and second arms and a second reel between the second and third arms. The reels may be of identical or different dimensions. For carrying said reels, said arms 7 are provided with notches 13 at their end in which the shafts of the reels are laid. Advantageously, each arm then includes at least two notches 13 and 13a of different widths for receiving, for example, a reel of a given diameter between the first and second arms and a reel of a different diameter between the second and third arms.

The mechanized unit also includes a digging wheel 15 connected to the rear of the motor driven vehicle 1. The digging wheel 15 is provided at its periphery with a plurality of evenly spaced digging tools 16 for digging and forming a trench 18. The digging wheel 15 is carried by a chassis 19 formed of two parts 20 and 21 hinged together about a shaft 22. The first part 20 is mounted on a bracket 23 fixed to the rear of the motor driven vehicle 1. The second part 21 of chassis 19 has more particularly two parallel spaced sides 24 carrying wheel 15 by means of a shaft 25, wheel 15 being disposed between the two sides 24. The digging wheel 15 is rotated about shaft 25 by means of a motor 25 fixed to part 21 of chassis 19. Such driving, well known per se, is provided by a gear wheel carried by the shaft of the motor cooperating with an inner toothed profile formed in wheel 15. In addition, the digging wheel 15 is raised and lowered about the pivot shaft 22 by means of a jack 27 hinged to part 20 and to part 21 of chassis 19. A protective cover 28 is associated with part 21 of the chassis, covering the rear of wheel 15.

The mechanized unit also includes a guide device 30 for laying for example cables 6 close to the bottom 31 of trench 18 formed by the digging wheel 15. The device 30 is fixed to the rear of cover 28 by appropriate fixing means and is thus connected to part 21 of chassis 19. This device 30 is formed of two plates 32 and 33 spaced apart and connected together by spacers 34. Cables 6 thus pass through the space formed between plates 32 and 33 while being guided by rollers 36 mounted on shafts 35 fixed to the plates, as well as by a cable tensioning system 37 formed of several rollers 38.

With the assembly of these rollers 36 and 38 the cables 6 passing between said plates 32 and 33 are thus guided and take on a given curvature so as to exit from device 30 substantially tangentially to the bottom 39 of trench 18. There are also provided, for guiding the cables coming from the reel towards device 30, guides 39 mounted on the motor driven vehicle 1, said cables then passing above the vehicle.

In accordance with the invention, the mechanized unit further includes a receptacle 40, connected to vehicle 1 and containing a fine powder material 41, and means 42 for feeding the powdery material from receptacle 40 to the guide device 30.

As it will be explained in greater detail in the operation of the mechanized unit, the fine powdery material 41 flows into the bottom 31 of trench 18 so that the cables 6 are laid thereon and are then buried therein; said cables 6 are thus protected by the covering formed by said powdery material.

Receptacle 40, in the shape of an upturned truncated cone shaped pyramid, is advantageously mounted on a trailer 43 hitched at 44 to the rear of the motor driven vehicle 1. Trailer 43 (FIG. 2) is disposed parallel to the digging wheel 15. The mechanized unit is then formed of a first line defined by the digging wheel 15 and the guide device 30 and a second line, parallel to the first one, defined by trailer 43.

Receptacle 40 includes a movable bottom 46 formed by a conveyor belt 47, possibly two, rotated by a motor not shown in the Figures. The feed means 42 are disposed under receptacle 40 in the vicinity of one end of the conveyor belt 47. Thus, the powdery material 42 driven and stirred by movement of the conveyor is poured into said feed means 42. These latter are formed for example by an endless screw 48, known per se, rotated by a motor not shown in the Figures. The endless screw is able to pivot about a shaft 49 connected to trailer 43 so as to be disposed transversally to receptacle 40, during operation of the mechanized unit.

According to another characteristic of the invention, signalling means 50 are provided formed, for example, by a strip, particularly for identifyng the type of cables laid in the trench. These means 50 are adapted to be disposed on the powdery material 41 surrounding the cables, and are arranged on a drum 51 mounted for rotation about a shaft 52 carried by a stirrup 53 fixed to plates 32 and 33 of the guide device 30. The flexible strip 55 is wound on the rotary drum 15 and, depending on its color, the type of cable buried in the powdery material 41 as well as the exact position of these cables in the ground may be determined.

According to the invention, means 60 for filling the trench bring back into this latter the amalgam of earth and rocks removed by the digging wheel 15 on each side of the trench. The filling means 60 are formed for example by two ploughshares 61 and 61a each connected to an arm 62 and 62a fixed to the guide device 30. More precisely, arm 62 carrying ploughshare 61 is fixed to plate 32 and the other arm 62a carrying ploughshare 61a is fixed to plate 33. The two ploughshares 61 and 62 are oriented so as to converge towards the vertical median plate of the trench, the point of convergence moving away from the guide device 30 connected to said digging wheel. Thus, the first line defined by the digging wheel 15 also includes, associated with the rear of the wheel, the guide device 30, the signalling means 50 and the filling means 60.

The operation of the mechanized unit of the invention is as follows: in the cabin of the motor driven vehicle 1 are situated the controls for the different motors and jacks acting on the above described elements forming said unit.

As can be seen in FIGS. 1 and 2, reel 5 is carried by arms 7 of support 8, which is brought to a high position by means of jacks 12, the low position is illustrated with dotted lines. The digging wheel 15 rotated by motor 26 then placed in the working position by means of jacks 27 then digs the trench 18 in ground 2 by means of a tool 16, at a given depth, the earth and the rocks are removed on each side of the trench 18.

The fine powdery material 41 such as fine sand, contained in receptacle 40 is stirred then driven towards the endless screw 48 which is then disposed transversally with respect to the two above mentioned lines; the motors acting on these different elements having been started up.

The endless screw 48 feeds the fine sand 41 through a funnel 59 facilitating introduction of the sand between the two plates 32 and 33 of the guide device 30. This latter, connected to part 21 of chassis 19 by cover 28 is consequently situated in trench 18. Thus, the fine sand 41 is deposited in the bottom 31 of trench 18. Cables 6, passing through guides 38, travel over rollers 36 and 38 and leave with a curvature substantially tangent to the bottom of the trench then are laid on the layer of fine sand 41. During laying of cables 6, the fine sand 41 continues to flow until the cables are covered with a layer of sand several centimeters in thickness.

Of course, the flow rate of the sand, the travelling speed of the cables, the moving speed of the motor driven vehicle and the speed of rotation of the digging wheel are determined beforehand.

Cables 6 are consequently buried in the vicinity of the bottom 31 of trench 18 in the fine sand 41, which provides an efficient protection of the cables against rocks or other sharp objects which may be present in the ground.

The illustration of these different simultaneous operations is shown more clearly in FIG. 3.

During the advance of the mechanized unit, particularly during burying of cable 6 by sand 41, the flexible strip 55 is unwound from drum 51 and is laid on the fine sand 41. Thus, in the case where it might be necessary subsequently to replace cables 6, their type would be identified by the color of the flexible strip, as well as their positions in the ground.

Once the flexible strip 55 has been laid, the trench is filled in by means of two ploughshares 51 and 61a, connected to the guide device. The ploughshares then bring back into the trench the amalgam of earth and rocks previously removed, which fills up the whole of the trench.

Such a mechanized unit in accordance with the invention provides determining advantages with respect to the mechanized units of the prior art particularly that of burying the cables laid in bottom of the trench with a fine powdery material serving as protection, the operation for covering the cables being carried out continuously and progressively as the trench is dug and said cables laid.

What is claimed is:

1. A mechanized unit for digging a trench in the ground and laying elongate continuous object, like tubes, cables or similar in said trench, comprising:
    a motor driven vehicle;
    a digging wheel connected to said vehicle;
    a reserve containing said elongate continuous object and connected to said vehicle;
    a receptacle containing a fine powdery material, which is sand, and mounted on a trailer hitched to said motor-driven vehicle, said trailer being disposed substantially parallel to said digging wheel; and
    means for feeding said fine powdery material from said receptacle on the trailer to said guide device so that, during formation of said trench by the digging wheel, said powdery material flows below said elongate continuous object in the bottom of the trench, and for then covering said elongate continuous object, this latter thus being buried in said fine powdery material deposited in said trench.

2. The mechanized unit as claimed in claim 1 wherein said receptacle containing said fine powdery material includes a movable bottom for driving and stirring said powdery material for removal thereof to said feed means.

3. The mechanized unit as claimed in claim 2 wherein said movable bottom of the receptacle is formed of at least one conveyor belt driven by a motor.

4. The mechanized unit as claimed in claim 1 wherein said means for feeding the fine powdery material are disposed transversally to said receptable, during digging of the trench.

5. The mechanized unit as claimed in claim 4 wherein said feed means are formed by an endless screw rotated by a motor.

6. The mechanized unit as claimed in claim 1 wherein said reserve is formed by a reel, on which said elongate continuous object is wound, said reel being mounted by means of its shaft in notches formed on arms mounted for pivoting on said motor-driven vehicle, and being disposed transversally with respesct to said vehicle.

7. The mechanized unit as claimed in claim 6 wherein each arm has at least two notches with thus the possibility of receiving different types of reels.

8. The mechanized unit as claimed in claim 7 wherein at least three arms are mounted in parallel on a support mounted for pivoting on said motor-driven vehicle.

9. The mechanized unit as claimed in claim 1 wherein said guide device for laying said elongate continuous object is formed of two plates spaced apart and connected together by spacers, said elongate continuous object thus passing into the space formed between said plates while being guided by a set of rotary rollers mounted on shafts fixed to said plates, these latter being fixed to a chassis carrying said digging wheel and being intended to be housed in said trench.

10. The mechanized unit as claimed in claim 1 further comprising signaling means, formed by a strip disposable on said fine powdery material surrounding said elongate continuous object.

11. The mechanized unit as claimed in claim 1 including at the rear of the guide device, means for filling said trench so as to bring back into the trench the earth removed by said digging wheel during the formation thereof.

12. The mechanized unit as claimed in claim 11 wherein said filling means are formed by two ploughshares, each connected to an arm fixed to the guide device, the two ploughshares being oriented so as to converge toward the median vertical plane of the trench, the point of convergence moving away from said guide device connected to said digging wheel.

* * * * *